US010367762B2

(12) United States Patent
Klose et al.

(10) Patent No.: US 10,367,762 B2
(45) Date of Patent: Jul. 30, 2019

(54) WIRELESS FLIGHT ATTENDANT PANELS

(71) Applicant: AIRBUS OPERATIONS GMBH, Hamburg (DE)

(72) Inventors: Peter Klose, Hamburg (DE); Matthias Heinisch, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 15/683,091

(22) Filed: Aug. 22, 2017

(65) Prior Publication Data
US 2018/0063034 A1 Mar. 1, 2018

(30) Foreign Application Priority Data

Aug. 25, 2016 (DE) .................. 10 2016 215 963

(51) Int. Cl.
| | |
|---|---|
| *H04L 12/931* | (2013.01) |
| *B64D 11/00* | (2006.01) |
| *G08B 5/22* | (2006.01) |
| *H04L 12/24* | (2006.01) |
| *H04L 29/08* | (2006.01) |

(52) U.S. Cl.
CPC .......... *H04L 49/40* (2013.01); *B64D 11/0015* (2013.01); *G08B 5/22* (2013.01); *H04L 41/0816* (2013.01); *H04L 41/24* (2013.01); *H04L 67/12* (2013.01)

(58) Field of Classification Search
CPC ... B64D 11/0015; G08B 5/22; H04L 41/0816; H04L 41/24; H04L 49/40; H04L 67/12
See application file for complete search history.

(56) References Cited

U.S. PATENT DOCUMENTS

| | | | |
|---|---|---|---|
| 2010/0195634 A1 | 8/2010 | Thompson | |
| 2014/0074322 A1 | 3/2014 | Baumgarten et al. | |
| 2015/0005989 A1 | 1/2015 | Beltrand | |
| 2016/0095045 A1 | 3/2016 | Salomon et al. | |

FOREIGN PATENT DOCUMENTS

DE    19710137 A1    10/1997

OTHER PUBLICATIONS

German Search Report for Application No. 102016215963 dated Apr. 26, 2017.
Heinisch, et al., "Enabling Maintenance Wireless Testing of Aircraft Cabin Components Without Modification of the Network Configuration," Workshop on Aircraft System Technologies (AST), Hamburg, Germany, pp. 1-8, dated Feb. 24-25, 2015.

*Primary Examiner* — Nadar Bolourchi
(74) *Attorney, Agent, or Firm* — Jenkins, Wilson, Taylor & Hunt, P.A.

(57) ABSTRACT

An adapter for tapping into an aircraft panel network in order to provide support for a wireless flight attendant panel (FAP). The adapter includes first and second connectors to insert into the server-to-FAP connection of the panel network and a third connector configured to connect to a wireless access point. The adapter has a housing to which the first, second and third connector are mounted, wherein the housing accommodates power and data connections between the first and second connectors as well as a panel network access connection line between the first connector and the third connector, thereby enabling connection of the panel network to a wireless access point.

15 Claims, 6 Drawing Sheets

PRIOR ART

PRIOR ART

WIRELESS FLIGHT ATTENDANT PANELS

CROSS-REFERENCE TO RELATED APPLICATION

This application claims priority to German Patent Application DE 10 2016 215 963.1 filed Aug. 25, 2016, the entire disclosure of which is incorporated by reference herein.

TECHNICAL FIELD

The present disclosure relates in general to cabin management and testing using flight attendant panels and more especially but not exclusively to enabling use of wireless flight attendant panels.

BACKGROUND

Cabin crew members use so-called flight attendant panels (FAP) to monitor and supervise cabin systems via the cabin management system. Potable water filling indication, doors and slides operation modes, passenger attendant calls, or cabin temperature control are some examples for systems that can be administered.

FIG. 1 is a schematic drawing of an aircraft 1 in the form of an Airbus A330 which has a master FAP 2 installed in the front door section and an optional, additional FAP 3 near the aft end of the cabin. The FAPs 2, 3 are connected to the aircraft's panel network (IP/Ethernet) 4. A cabin intercom data system (CIDS) network 5 is also connected to the panel network. A server 6 often referred to as director or DIR forms an interface between a computer hosting the CIDS 5 and the FAPs 2, 3. Many electronic devices in the cabin are controlled and monitored via the FAPs. Maintenance teams perform tests using the FAPs. The checks are initiated from the FAP by one worker, while a second worker observes the devices under test. For example the water tank filling level meter or door sensors are verified in this way. FAPs are also used in production to make quality control tests.

It would be desirable if an additional FAP could be provided which is embodied in a mobile terminal. Such a mobile FAP could be carried around the cabin, enabling a single worker to both initiate and confirm the results of tests, i.e. without running forth and back between the (fixed) FAP and the test location. Provision of a mobile FAP would also eliminate a potential bottle neck for inspections, which is waiting for access to the (fixed) FAP. This is a significant issue, since, for example on an Airbus A350 XWB, there are 108 maintenance tasks where the FAP is involved.

While building a wireless FAP capability into a new aircraft is one issue, retrofitting a wireless FAP capability into an aircraft without wireless capability is another. For new aircraft, the cabin intercom data system (CIDS) incorporates a wireless capability, with the so-called electronic CIDS (eCIDS). The challenge is therefore how to retrofit support for wireless FAPs into a non-wireless CIDS.

Heinisch, Fischer and Nahm "ENABLING MAINTENANCE WIRELESS TESTING OF AIRCRAFT CABIN COMPONENTS WITHOUT MODIFICATION OF THE NETWORK CONFIGURATION" AST 2015 Feb. 24-25, Hamburg, Germany describes a method of retrofitting wireless test equipment into a CIDS.

FIG. 2 is a schematic block diagram of the design concept of Heinisch et al. A man-in-the-middle (MitM) computer 10 is inserted in the panel network's Ethernet line between server (DIR) 6 and the master FAP 2. The MitM computer 10 can then act as a wireless hub, i.e. can include a mobile or wireless access point (WAP) 12, which can then allow a mobile or wireless FAP 14 to communicate with the CIDS 5. For the fixed and mobile FAPs 2, 3, 14, the MitM computer 10 identifies itself as the server and for the server 6 any data packet is forwarded with the sender address of the master FAP 2 and is intercepted and relayed by the MitM computer 10.

FIG. 3 is a schematic showing the connection of the MitM computer 10 into the CIDS 5 for the design of Heinisch et al. An adapter 16 is fitted into the aircraft panel network 4 between the master FAP 2 and server DIR 6. A DC/DC converter 18 is housed in the adapter 16 to convert the aircraft 28V DC power supply into 12V to supply the MitM computer 10. The MitM computer 10 captures the aircraft panel network connection from the server DIR 6 in one Ethernet connection 20 and the aircraft panel network connection from the FAP in another Ethernet connection 22, and relays any network traffic which it intercepts so that it does not disturb any network communication which would be taking place if it was not present.

A complication in management of panel network traffic in the presence of the adapter 16 may arise, if an additional backup line for the panel network 4 is provided from the FAPs to the server. A FAP 2, 3 might then connect to the server 6 either via the backup line or the standard panel network connection and thus discover the WAP 12 on the standard line, in which case the server 6 would appear twice in the panel network with different hardware addresses. Therefore, with the MitM solution, any backup connection needs to be severed before testing testing with the mobile FAP 14 can be performed. Then, after use of the mobile FAP 14, e.g. for testing on the production line, these backup line connections need to be restored and a final connection test performed to check the restoration has been effective.

SUMMARY

According to a first aspect of the disclosure herein, there is provided an adapter for tapping into an aircraft panel network, the adapter comprising:
 a first connector configured to connect to a flight attendant panel, FAP, connector;
 a second connector configured to connect to a server connector;
 a third connector configured to connect to a wireless access point;
 a housing to which the first, second and third connector are mounted, wherein the housing accommodates power and data connections between the first and second connectors as well as a panel network access connection line between the first connector and the third connector, thereby enabling connection of the panel network to a wireless access point.

The inconvenience and overhead of including a MitM computer is thus avoided as well as the need to disable any backup connection lines for the panel network before use of wireless FAPs.

The adapter housing may include an elongate extension tab formed integrally therewith, which highlights the installation of the adapter to flight operatives, even if the FAP area is hidden by a cover.

The adapter may or may not further comprise a DC/DC converter for converting between the voltage of the cabin intercom data system and the voltage of the wireless access point which is mounted inside the adapter housing.

In certain embodiments, at least the first and second connectors are 50-pin D-SUB connectors, and optionally the third connector is an RJ-45 connector.

According to a second aspect of the disclosure herein, there is provided a system comprising: a flight attendant panel; and a network adapter according to the first aspect of the disclosure herein connected to the flight attendant panel via its first connector.

The system may further comprise one or more servers connected to the network adapter via the adapter's second connector. The system may further comprise a wireless access point connected with a wired connection to the third connector. The system may further comprise a wireless FAP connected wirelessly to the wireless access point.

According to a third aspect of the disclosure herein there is provided a method for testing aircraft functions, comprising:

- disconnecting wired panel network connectors between a server and a flight attendant panel;
- inserting an adapter in series with the wired panel network connectors with first and second connectors of the adapter;
- connecting a third connector of the adapter to a wireless access point;
- performing aircraft testing functions with a wireless flight attendant panel wirelessly connected to the aircraft's panel network via the wireless access point; and
- removing the adapter and reconnecting the wired panel network connectors.

The method may further comprise the steps of:

- removing a cover of the flight attendant panel in order to insert the adapter; followed by
- replacing the cover prior to performing the aircraft testing functions; and
- removing the cover before removing the adapter; and
- replacing the cover after removing the adapter,
- wherein the adapter is visible when the cover is in place by virtue of an elongate extension tab formed integrally with the adapter which extends beyond the cover when the cover is in place.

BRIEF DESCRIPTION OF THE DRAWINGS

Preferred embodiments of the disclosure herein will further be described by way of example only with reference to exemplary embodiments illustrated in the figures.

DETAILED DESCRIPTION

Figure 1:
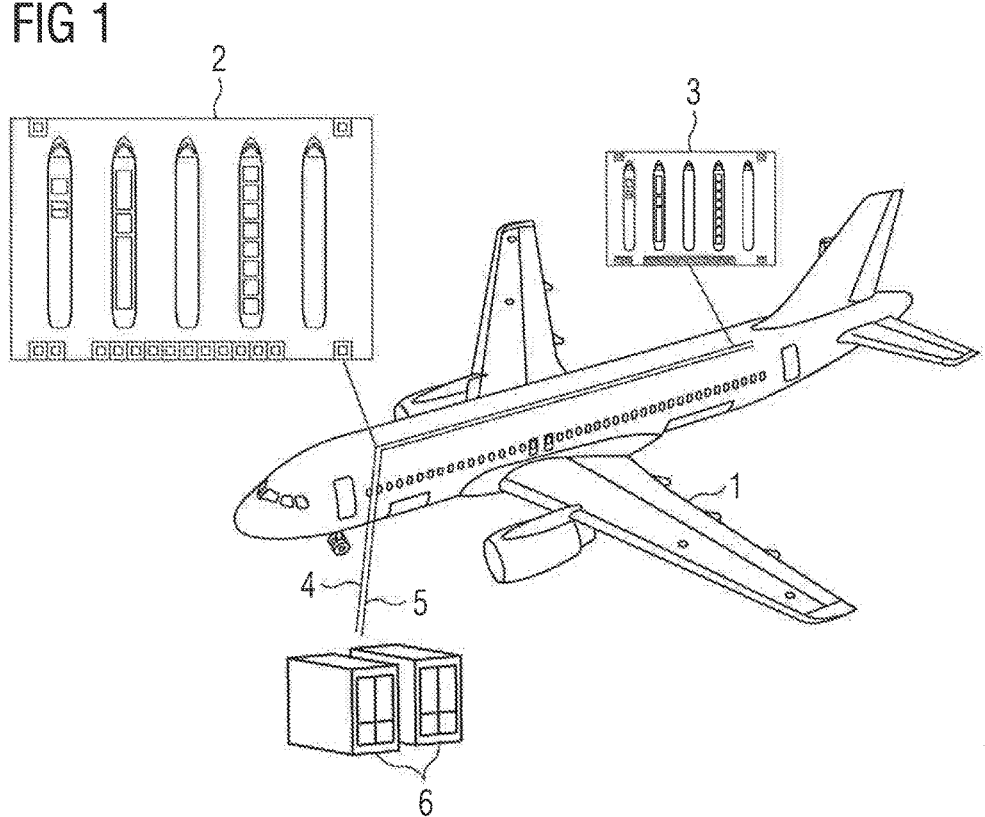
FIG. 1 is a schematic drawing of an aircraft showing selected network components and FAPs.
Figure 2:
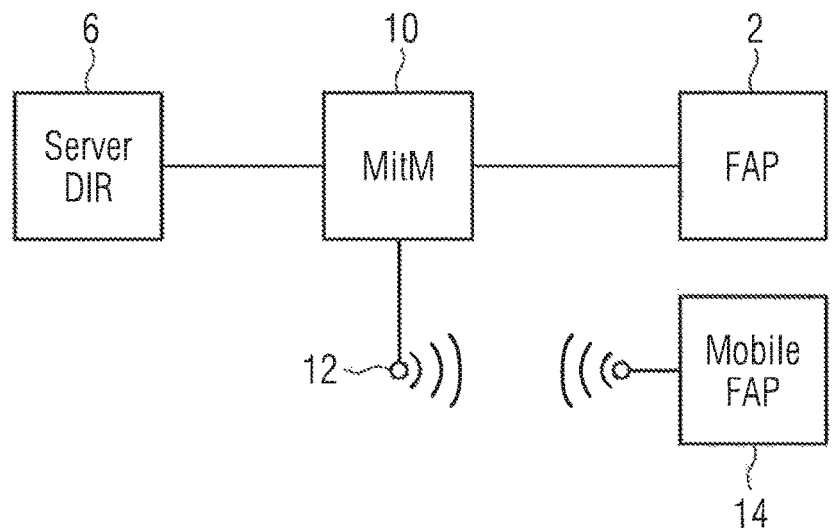
FIG. 2 is a schematic block diagram of a prior art design for supporting a mobile FAP making use of a MitM computer to provide a wireless access point.
Figure 3:
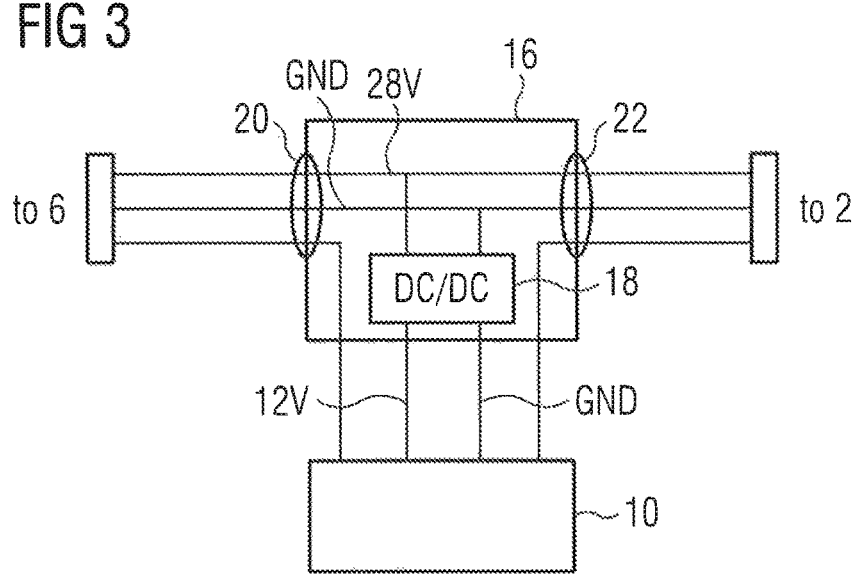
FIG. 3 is a schematic block diagram showing the prior art adapter used to connect the MitM computer of FIG. 2 into the CIDS.
Figure 4:
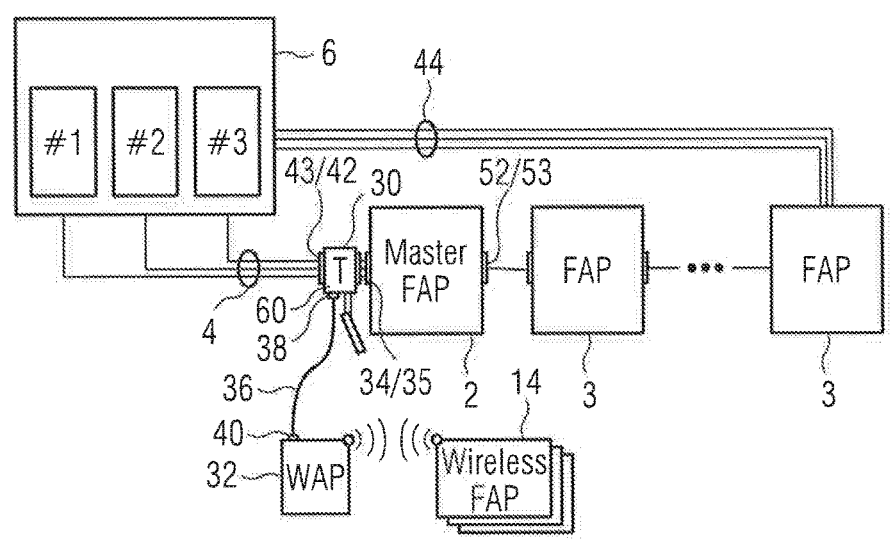
FIG. 4 shows a system embodying the disclosure herein in which a standard panel network has been modified to support mobile FAPs through insertion of an adapter and mobile access point.

FIG. 4 shows a system embodying the disclosure herein in which a standard panel network 4 has been modified to support mobile FAPs 14 through insertion of an adapter 30 and a mobile or wireless access point (WAP) 32. The adapter 30 is inserted at the server-side master FAP connector 35 with a corresponding, oppositely sexed, connector 34. The normal connector 43 from the server 6 to the master FAP connector 35 is then connected to a corresponding, oppositely sexed connector 42 on the adapter 30. A network cable 36, e.g. an Ethernet cable, is then tapped off from the main panel network cabling to the WAP 32 by another connector 38, which may be an RJ-45 socket or other suitable socket 38 to which a network cable 36 can be connected which runs to the WAP 32. The WAP 32 also has an RJ-45 or other suitable socket 40 for connecting the other end of the network cable 36. (It will be appreciated that references to plug and socket and not limitative, and these can of course be interchanged.) The WAP 32 is then able to communicate wirelessly with one or more wireless FAPs 14. One or more further FAPs 3, if provided, are connected from the master FAP via a connector 52 which connects to an oppositely sexed panel network cable socket 53.

The system also includes an additional backup connection line 44 for the panel network 4 extending from the last FAP 3 in the chain the server 6. The FAPs 2, 3 are able to connect to the server 6 either via the backup connection line 44 or the standard panel network connection 4. It is noted that with the solution adopted here of an adapter 30 and WAP 32 operates in the presence of the backup line 44, so there is no need to interrupt the backup connection line before testing with a wireless FAP 14 can be performed.

Other connection options are possible for the adapter instead of inserting at the server-side master FAP connector between the master FAP and the server(s). Namely, the adapter could be plugged into the server connector or plugged in somewhere on the network between the master FAP and the server(s). The FAP connector is considered to be the most attractive choice regarding installation effort, power supply, security, and accessibility.

For safety reasons, multiple redundant servers 6 may be installed in the system, three being shown, labelled #1, #2 and #3.

Figure 5:
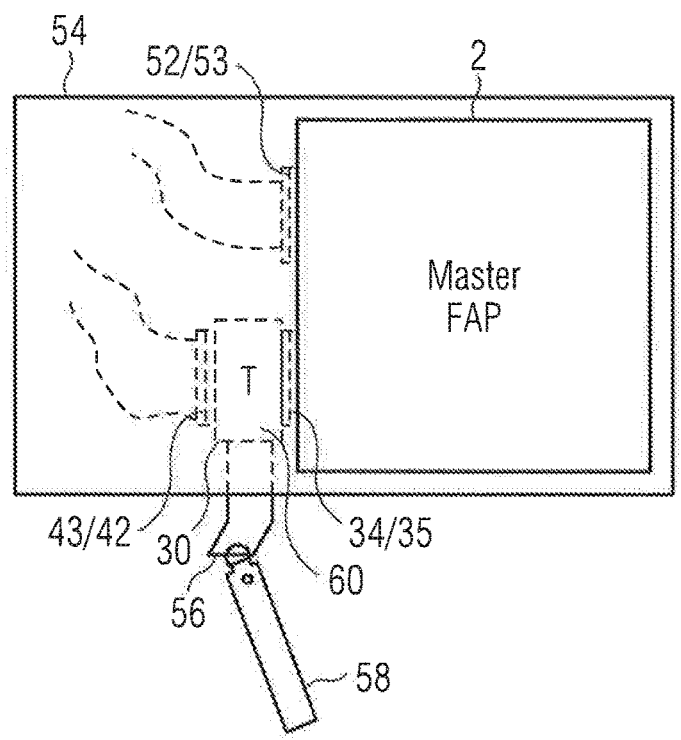
FIG. 5 shows the adapter of FIG. 4 when installed by connecting to a master FAP.

FIG. 5 shows the adapter 30 of FIG. 4 as it appears in a typical situation in the aircraft. The adapter 30 is connected between the server-side FAP connector 35 and the panel network connector 43 which normally connects to the FAP connector 35. Also visible are the network panel cables leading to the master FAP and from the master FAP, i.e. connected to the above-mentioned connector 52. Since, in a typical aircraft, the master FAP 2 is situated behind a cover 54, the main part of the adapter 30 is hidden. To avoid the adapter 30 being invisible to operators when the cover 54 is fitted, the adapter's main housing 60 includes an elongate extension tab 56 formed integrally therewith, which extends beyond the master FAP cover and is so visible when the cover 54 is fitted, and thus highlights the fact that the adapter 30 is currently installed. As schematically illustrated, the extension tab 56 also has attached to it its distal end through a ringlet a strip of flexible material 58. Visibility of the adapter 30 outside the cover 54 is important so that operatives can see if the adapter 30 is installed. This reduces the chance of the adapter 30 being accidentally left in place after testing is complete. The adapter 30 should not be installed apart from when in use, and specifically not during flight.

Figure 6:
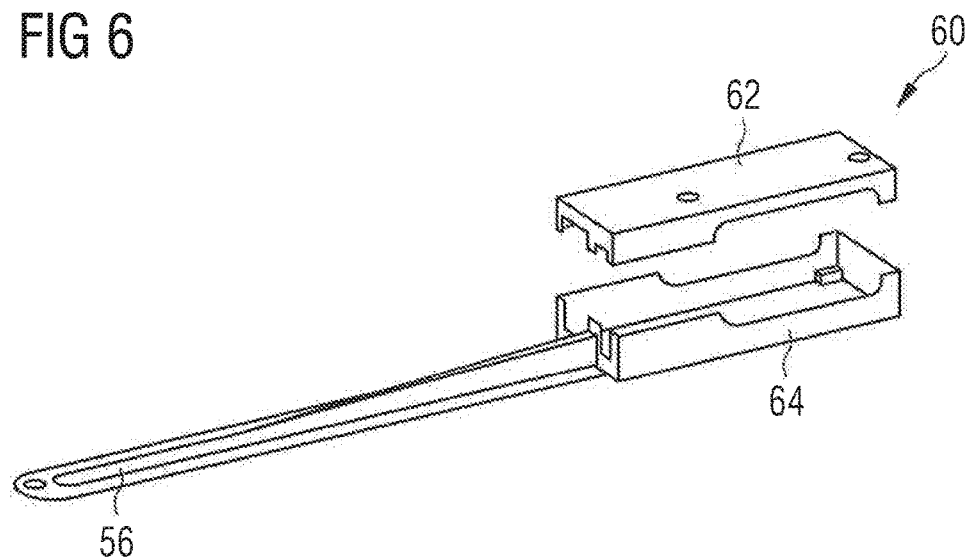
FIG. 6 is an exploded perspective view of upper and lower housing parts of the adapter of FIG. 4.

FIG. 6 is an exploded perspective view of the adapter housing 60. The adapter housing 60 is in two principal parts, an upper part 62 and a lower part 64, the two parts being secured together with suitable fasteners or by bonding. The lower part 64 of the adapter housing 60 has integrally formed as part thereof the above-mentioned extension tab 56. The extension tab 56 is dimensioned to extend significantly beyond the boundary of the FAP cover 54 and may have a length of a multiple of the dimension of the housing main body 60 in the direction of extension of the tab 56, for example 2, 2.5, 3, 3.5, 4, 5, 6, 7, 8, 9 or 10 times the length of the main body within a limit of ±0.5 times, that is 1-5-2.5 times, 2-3 times and so forth. As schematically illustrated the extension tab 56 may also have attached to proximal the distal end thereof, e.g. through a ringlet, a strip of material or other flexible material 58. The strip 58 may be provided with suitable text marking, such as the illustrated "REMOVE BEFORE FLIGHT". The strip 58 may be brightly colored to make it more noticeable, for example scarlet. In alternative embodiments, the extension tab 56 may be omitted or made shorter than the cover extension, so that it does not extend beyond the FAP cover 54. In that case, the presence of the adapter 30 when the FAP cover 54 is fitted is ensured by the external visibility of the strip 58.

Figure 7:
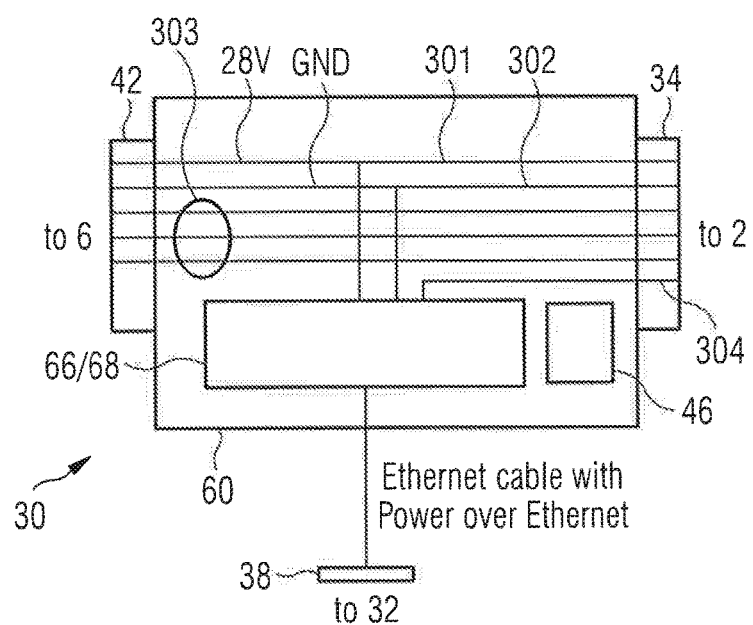
FIG. 7 is a schematic drawing of the adapter showing its internal wiring connections.

FIG. 7 is a schematic drawing of the adapter 30 showing the internal wiring paths. The adapter 30 comprises three principal connectors 34, 38, 42 accommodated in a housing. There are the two connectors 34, 42 for inserting the adapter inline with the panel network, namely a connector 42 for the server-side connection and a similar, but oppositely sexed connector 34 for the master FAP-side connection. These two connectors may be D-SUB connectors, such as 50-pin D-SUB connectors, where it will be understood that these two connectors will conform to whatever connector type is used by the panel network here. There is also a third connector 38 provided to branch off a panel network connection from the master FAP to a wireless (or mobile) access point. A suitable connector here is an RJ-45 socket, so that a CAT5 or CAT6 cable can be plugged into the third connector at one end and into another RJ-45 socket belonging to the WAP at the other end. There is thus an internal line 304 in the housing between the third connector 38 and the FAP-side connector 34 to provide panel network access.

The adapter 30 also has further internal connection lines within the housing that connect the corresponding D-SUB pins together. There are connection lines for power supply, namely a live 28V connection line 301 and a ground connection line 302. There are also various data lines 303 (only three being shown in the schematic representation). The DC power supply lines 301, 302 also optionally extend to the third connector 38 as required. Optionally, the housing may also accommodate a DC/DC converter 66 for converting between the voltage of the CIDS (28V) and the voltage of the wireless access point (e.g. 12V or 5V). In other embodiments a DC/DC converter with the same functionality can be provided external to the adapter, so that the adapter's third connector 38 connects with the external DC/DC converter which in turn connects to the wireless access point. In still further embodiments, the wireless access point 32 has no need of power from the panel network, for example has its own power supply, so no DC/DC converter is provided. A Power-over-Ethernet (PoE) adapter 68 may also be provided inside the adapter housing if needed.

The adapter 30 may additionally include a sensor 46 for detecting integrity of the extension tab 56 and/or the material strip 58. For example, a circuit path may be incorporated in the extension tab 56 so that if it were broken off, the circuit path would also be broken, which would then be detected by the sensor in the adapter 30, e.g. located in the adapter housing 60. In the same way, a circuit path may be woven into a fabric implementation of the strip 58 so that if the strip is torn or removed from its attachment to the extension tab 56, the sensor detects a failure. The master FAP 2 could then be programmed to detect the sensor status, and if the integrity of the extension tab 56 or strip 58 was detected to be compromised, programmed to communicate this to any wireless FAPs 14 communicating with the WAP 32. The adapter 30 may instead or in addition also be configured to generate or cause to be generated in some external part, such as the FAP, server or WAP, an error message which can then be captured by the wireless FAPs 14 (and/or the wired FAPs 2, 3). The error message can then be displayed on the graphical user interface thereof or otherwise acted upon by the FAP. In turn the applications running on the wireless FAPs 14 could then be programmed to indicate this failure to the wireless FAP user via the graphical user interface. This could simply be a failure message which did not interfere with functionality, or a more intrusive partial or full disabling of the wireless FAP functionality. As well as or instead of these measures, a failure message from the sensor could cause the master FAP 2 (or the server 6) to disable the functionality of the adapter to interface with the WAP 32, while still permitting through traffic between the server 6 and FAPs 2, 3 on the wired panel network 4. In other words, the failure message causes the panel network to have the same functionality as if the adapter 30 were not installed.

Figure 8A:
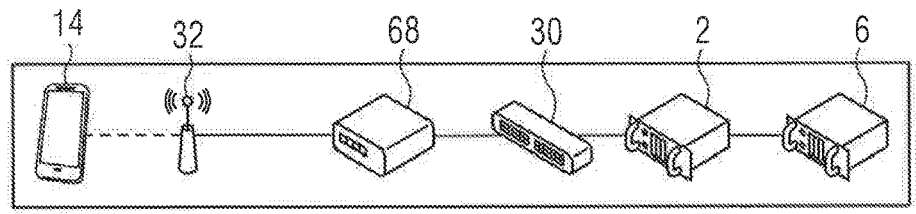
FIG. 8A shows a first installation option embodying the disclosure herein based on an MP-FAP access point.

FIG. 8A shows a first installation option embodying the disclosure herein based on a multi-purpose (MP) FAP access point. This is essentially as described above.

Figure 8B:
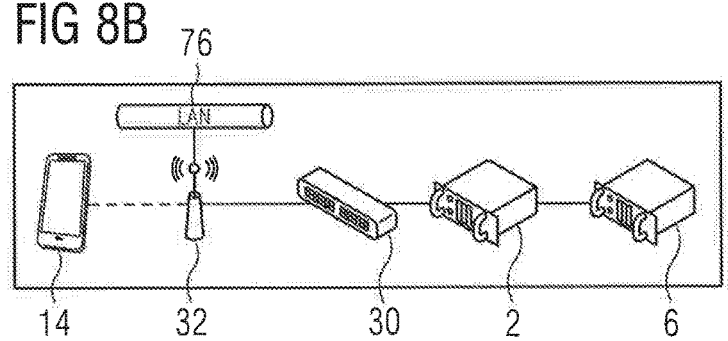
FIG. 8B shows a second installation option embodying the disclosure herein based on a FAL wireless access point.

FIG. 8B shows a second installation option embodying the disclosure herein based on using a final assembly line (FAL) wireless access point which is already present in the production environment as the wireless access point for the wireless FAP. This shows connection to a local area network (LAN) 76, which may be part of a corporate network, for example at the production site or a maintenance site, so that the remote FAP may also communicate with this LAN 76 and specifically computers (not shown) that are connected to the LAN 76.

Figure 8C:
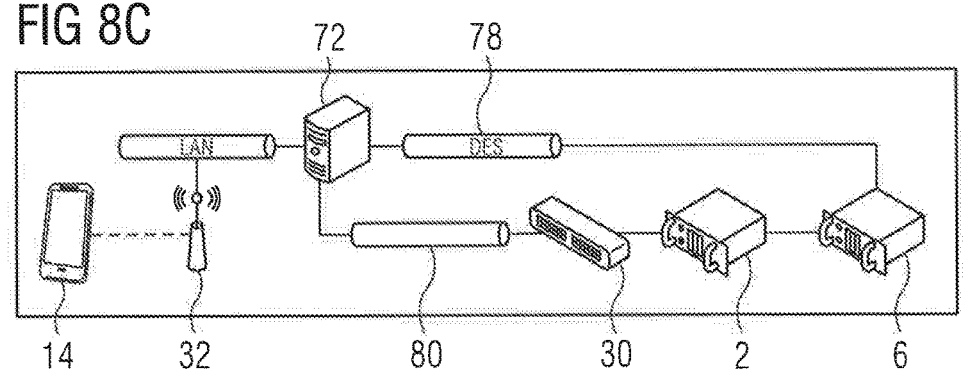
FIG. 8C shows a third installation option embodying the disclosure herein based on an ESAO tablet with FAL wireless access point.

FIG. 8C shows a third installation option embodying the disclosure herein based on an ESAO (Essais au Sol Assistés par Ordinateur) tablet on which is additionally loaded an application to carry out the mobile FAP functions, and which thus acts as the mobile FAP 14 as well as a conventional ESAO tablet. The mobile FAP 14 is in wireless communication with a FAL wireless access point 32 which also provides a wireless connection to a LAN 76 to which an ESAO execution server 72 is connected. The ESAO system is a computer-aided ground test system for automated ground testing of aircraft on the production line. The ESAO execution server 72 is connected via a remote FAP network 80 and an adapter 30 to a master FAP 2, which in turn is connected to a DIR server 6. The ESAO execution server 72 is also connected via a digital equipment simulator (DES) network 78 to the aircraft systems via a network connection to the DIR server 6.

Figure 8D:
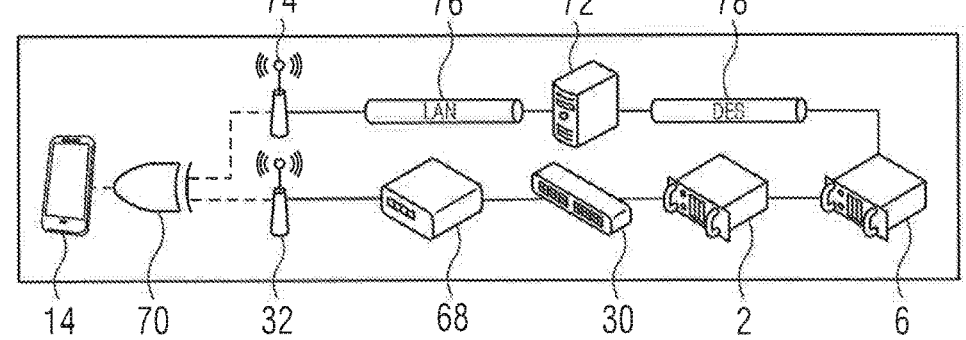
FIG. 8D shows a fourth installation option embodying the disclosure herein based on an ESAO tablet and MP-FAP wireless access point.

FIG. 8D shows a fourth installation option embodying the disclosure herein based on an ESAO tablet and MP-FAP wireless access point 32 which is exclusively OR'ed with an appropriate logic unit 70 to an ESAO execution server 72 via a further WAP 74 and a local area network (LAN) 76 to which the ESAO execution server 72 is connected. The ESAO execution server 72 is also connected via a DES network 78 to the aircraft systems via a network connection to the DIR server 6.

It will be understood that the ESAO implementations are directed to aircraft testing during production, whereas the non-ESAO implementations are directed to aircraft testing during maintenance. The ESAO execution server 72 is also connected via a DES network 78 to the aircraft systems via a network connection to the DIR server 6.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An adapter for tapping into an aircraft panel network, the adapter comprising:
 a first connector configured to connect to a flight attendant panel (FAP) connector;
 a second connector configured to connect to a server connector;
 a third connector configured to connect to a wireless access point; and
 a housing to which the first, second and third connectors are mounted, wherein the housing accommodates power and data connections between the first and second connectors as well as a panel network access connection line between the first connector and the third connectors, thereby enabling connection of the panel network to a wireless access point;
 wherein the housing comprises an elongate extension tab formed integrally therewith for highlighting installation of the adapter to flight operatives.

2. The adapter of claim 1, wherein the adapter comprises a sensor operable to detect integrity of the extension tab.

3. The adapter of claim 1, wherein the housing comprises a flexible strip formed integrally therewith for highlighting installation of the adapter to flight operatives.

4. The adapter of claim 3, wherein the adapter comprises a sensor operable to detect integrity of the material strip.

5. The adapter of claim 1, further comprising a DC/DC converter for converting between voltage of a cabin intercom data system and voltage of the wireless access point which is mounted inside the adapter housing.

6. The adapter of claim 1, wherein the adapter is devoid of a DC/DC converter for converting between voltage of a cabin intercom data system and voltage of the wireless access point within the adapter housing.

7. The adapter of claim 1, wherein at least the first and second connectors are 50-pin D-SUB connectors.

8. A system comprising:
 a flight attendant panel; and
 a network adapter, connected to the flight attendant panel via its first connector, the network adapter comprising an adapter for tapping into an aircraft panel network, the adapter comprising:
  a first connector configured to connect to a flight attendant panel (FAP) connector;
  a second connector configured to connect to a server connector;
  a third connector configured to connect to a wireless access point; and
  a housing to which the first, second and third connectors are mounted, wherein the housing accommodates power and data connections between the first and second connectors as well as a panel network access connection line between the first connector and the third connectors, thereby enabling connection of the panel network to a wireless access point;
  wherein the housing comprises an elongate extension tab formed integrally therewith for highlighting installation of the adapter to flight operatives.

9. The system of claim 8, further comprising a server connected to the network adapter via the second connector.

10. The system of claim 8, further comprising a wireless access point connected with a wired connection to the third connector.

11. The system of claim 10, further comprising a wireless FAP connected wirelessly to the wireless access point.

12. A method for testing aircraft functions, comprising:
 disconnecting wired panel network connectors between a server and a flight attendant panel;
 inserting an adapter, comprising a housing to which a first connector, a second connector, and a third connector are mounted, in series with the wired panel network connectors, wherein the first connector and the second connector of the adapter are connected to the wired panel network connectors;
 connecting the third connector of the adapter to a wireless access point;
 performing aircraft testing functions with a wireless flight attendant panel wirelessly connected to the aircraft's panel network via the wireless access point; and
 removing the adapter and reconnecting the wired panel network connectors;
 wherein the housing comprises an elongate extension tab formed integrally therewith for highlighting installation of the adapter to flight operatives.

13. The method of claim 12, further comprising:
 removing a cover of the flight attendant panel in order to insert the adapter; followed by
 replacing the cover prior to performing the aircraft testing functions; and
 removing the cover before removing the adapter; and
 replacing the cover after removing the adapter,
 wherein the adapter is visible when the cover is in place by virtue of an elongate extension tab formed integrally with the adapter which extends beyond the cover when the cover is in place.

14. An adapter for tapping into an aircraft panel network, the adapter comprising:
 a first connector configured to connect to a flight attendant panel (FAP) connector;

a second connector configured to connect to a server connector;

a third connector configured to connect to a wireless access point; and a housing to which the first, second and third connectors are mounted, wherein the housing accommodates power and data connections between the first and second connectors as well as a panel network access connection line between the first connector and the third connectors, thereby enabling connection of the panel network to a wireless access point;

wherein the housing comprises a flexible strip formed integrally therewith for highlighting installation of the adapter to flight operatives.

15. The adapter of claim 14, wherein the adapter comprises a sensor operable to detect integrity of the material strip.

\* \* \* \* \*